US010853289B2

(12) United States Patent
Srivastava et al.

(10) Patent No.: US 10,853,289 B2
(45) Date of Patent: Dec. 1, 2020

(54) SYSTEM, APPARATUS AND METHOD FOR HARDWARE-BASED BI-DIRECTIONAL COMMUNICATION VIA RELIABLE HIGH PERFORMANCE HALF-DUPLEX LINK

(71) Applicant: Intel Corporation, Santa Clara, CA (US)

(72) Inventors: Amit Kumar Srivastava, Folsom, CA (US); Asad Azam, Folsom, CA (US); Rajesh Bhaskar, Bangalore (IN); Mikal Hunsaker, El Dorado Hills, CA (US); Enrico D. Carrieri, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/221,962

(22) Filed: Dec. 17, 2018

(65) Prior Publication Data
US 2019/0121765 A1 Apr. 25, 2019

(51) Int. Cl.
| G06F 13/36 | (2006.01) |
| G06F 13/364 | (2006.01) |
| H04L 12/801 | (2013.01) |
| H04L 12/835 | (2013.01) |
| G06F 13/24 | (2006.01) |
| G06F 13/16 | (2006.01) |

(Continued)

(52) U.S. Cl.
CPC ........ *G06F 13/364* (2013.01); *G06F 13/1642* (2013.01); *G06F 13/1673* (2013.01); *G06F 13/24* (2013.01); *G06F 13/4282* (2013.01); *H04L 5/16* (2013.01); *H04L 47/30* (2013.01); *H04L 47/39* (2013.01); *G06F 2213/0016* (2013.01); *G06F 2213/0024* (2013.01)

(58) Field of Classification Search
CPC ............. G06F 13/1642; G06F 13/4282; G06F 13/1673; G06F 13/24; H04L 15/16; H04L 47/30
See application file for complete search history.

(56) References Cited

U.S. PATENT DOCUMENTS

| 7,406,546 B1* | 7/2008 | Vignon ............... G06F 13/4282 710/33 |
| 2008/0082708 A1* | 4/2008 | Wong ....................... G06F 13/37 710/111 |
| 2010/0169523 A1 | 7/2010 | Dunstan et al. |

(Continued)

OTHER PUBLICATIONS

Satwant Singth MIPI I3C Interface—Advance Features, mipi Devcon (Year: 2017).*
Mipi alliance Specification for I3C basic, (Year: J192).*
Mipi alliance, Introduction to the MIPI I3C Standardized Sensor Interface (Year: 8201).*
Mipi alliance System Integrators Application Note for MIPI I3C v1.0 and I3C Basic (Year: 1282).*
MIPI Alliance, "Specification Brief, Audio & Control: SLIMbus®, SoundWireSM," Oct. 7, 2014, 1 page.

(Continued)

*Primary Examiner* — Henry Tsai
*Assistant Examiner* — Christopher A Daley
(74) *Attorney, Agent, or Firm* — Trop, Pruner & Hu, P.C.

(57) ABSTRACT

In one embodiment, a host controller includes: a first credit tracker comprising at least one credit counter to maintain credit information for a first device; and a first credit handler to send a command code having a first predetermined value to indicate a credit request to request credit information from the first device, where the first credit tracker is to update the at least one credit counter based on receipt of an in-band interrupt from the first device having the credit information. Other embodiments are described and claimed.

20 Claims, 9 Drawing Sheets

(51) Int. Cl.
*G06F 13/42* (2006.01)
*H04L 5/16* (2006.01)

(56) References Cited

U.S. PATENT DOCUMENTS

| | | | |
|---|---|---|---|
| 2013/0086296 A1* | 4/2013 | Lakshmanamurthy | G06F 13/364 710/314 |
| 2013/0086586 A1* | 4/2013 | Lakshmanamurthy | G06F 15/7807 718/100 |
| 2013/0335151 A1 | 12/2013 | Schrom et al. | |
| 2014/0016679 A1 | 1/2014 | Kesling et al. | |
| 2014/0229644 A1 | 8/2014 | Thanigasalam et al. | |
| 2017/0034284 A1 | 2/2017 | Smith et al. | |
| 2017/0041127 A1* | 2/2017 | Sharpe-Geisler | H04L 7/0012 |
| 2018/0004699 A1 | 1/2018 | Quiet et al. | |
| 2018/0052791 A1 | 2/2018 | Srivastava et al. | |
| 2018/0157286 A1 | 6/2018 | Quiet et al. | |
| 2018/0293196 A1 | 10/2018 | Srivastava et al. | |
| 2018/0365188 A1 | 12/2018 | Srivastava | |
| 2018/0367504 A1 | 12/2018 | Srivastava | |
| 2019/0004991 A1 | 1/2019 | Foust et al. | |
| 2019/0033910 A1 | 1/2019 | Eder et al. | |
| 2020/0119753 A1* | 4/2020 | Chirca | G06F 9/3897 |

OTHER PUBLICATIONS

U.S. Appl. No. 15/706,913, filed Sep. 18, 2017, entitled "System, Apparatus and Method for Secure Communication on a Bus," by Amit Kumar Srivastava.
U.S. Appl. No. 15/237,928, filed Aug. 16, 2016, entitled "Method, Apparatus and System for Role Transfer Functionality for a Bus Master," by Amit Kumar Srivastava, et al.
U.S. Appl. No. 15/366,001, filed Dec. 1, 2016, entitled "Method, Apparatus and System for Dynamic Clock Frequency Control on a Bus," by Duane G. Quiet, et al.
U.S. Appl. No. 15/198,027, filed Jun. 30, 2016, entitled "Method, Apparatus and System for Dynamic Optimization of Signal Integrity on a Bus," by Duane G. Quiet.
U.S. Appl. No. 15/627,735, filed Jun. 20, 2017, entitled "System, Apparatus and Method for Extended Communication Modes for a Multi-Drop Interconnect," by Amit Kumar Srivastava.
U.S. Appl. No. 15/635,299, filed Jun. 28, 2017, entitled "Method, Apparatus and System for Dynamic Control of Clock Signaling on a Bus," by Kenneth P. Foust, et al.
U.S. Appl. No. 15/627,749, filed Jun. 20, 2017, entitled "System, Apparatus and Method for Tunneling and/or Multiplexing Via a Multi-Drop Interconnect," by Amit Kumar Srivastava.
U.S. Appl. No. 15/483,079, filed Apr. 10, 2017, entitled "System, Apparatus and Method for Link Training for a Multi-Drop Interconnect," by Amit Kumar Srivastava.

* cited by examiner

SYSTEM, APPARATUS AND METHOD FOR HARDWARE-BASED BI-DIRECTIONAL COMMUNICATION VIA RELIABLE HIGH PERFORMANCE HALF-DUPLEX LINK

TECHNICAL FIELD

Embodiments relate to communication via multi-drop bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification-based bus, available from the MIPI Alliance™ (www.mipi.org). This interface is expected to be used to connect devices, such as internal or external sensors or so forth, to a host processor, applications processor or standalone device via a host controller or input/output controller.

DETAILED DESCRIPTION

In various embodiments, techniques are provided to enable bi-directional communications reliably via a half-duplex link. More specifically, embodiments may leverage command codes and in-band interrupts to communicate credit information in a low latency, simplified manner. And, with embodiments herein low level hardware circuitry within transmitter and receiver is used to maintain credit information and perform credit-based flow control, such that interaction between this low level circuitry and software can be avoided for controlling bi-directional communication. As such, embodiments minimize higher level protocol/software overhead, improving performance on the bus. In addition as described herein, transaction ordering rules and traffic classes for communications of other protocols to be communicated via a bus can occur. And such credit handling and bi-directional bus direction control can be implemented in a peer-to-peer manner via a multi-drop bus. In some embodiments, communication entities on such bus may be separate integrated circuits (ICs) or can be independent circuitry within a single IC. Understand that such credit handling and data communications can occur on this bus with a minimal set of wires, e.g., a single pair of wires for each independent interface. With embodiments herein, error conditions in which a receiver does not have sufficient space to accept a payload can be avoided, reducing need for software intervention.

Figure 1:
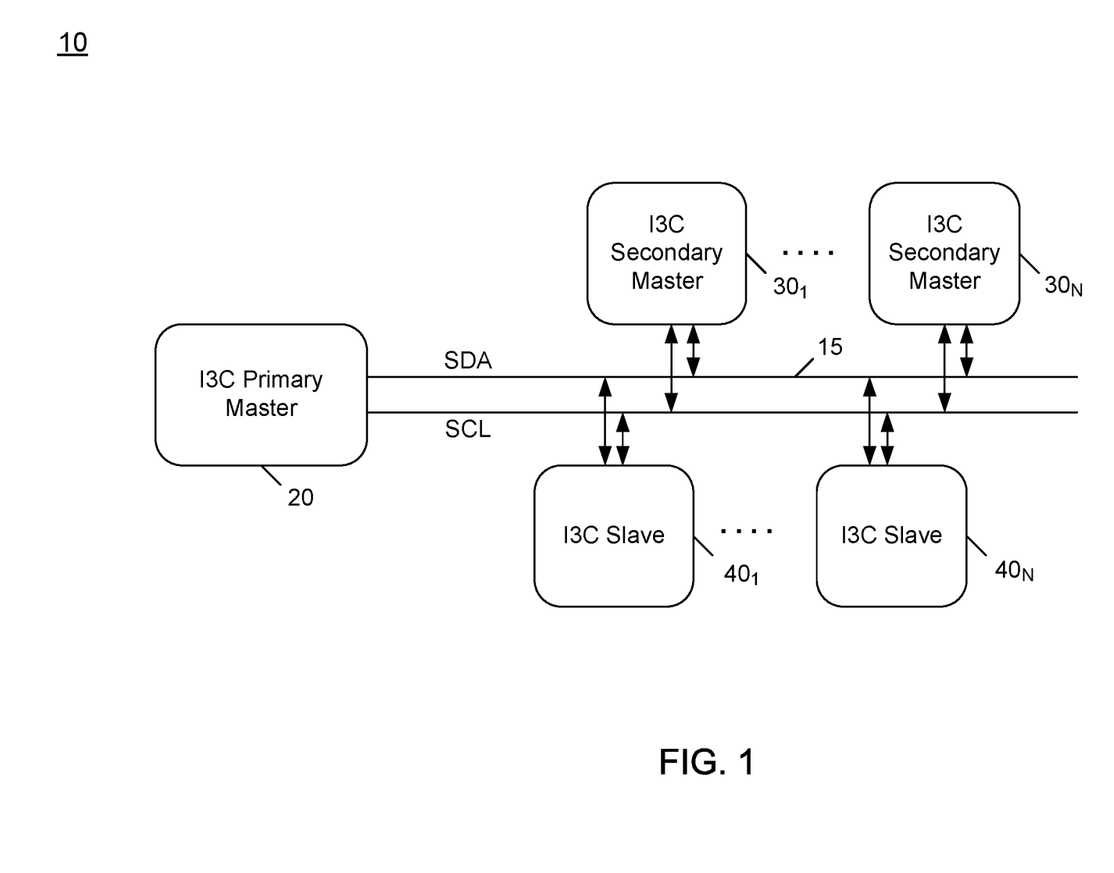
FIG. 1 is a block diagram of a system in accordance with an embodiment of the present invention.

Referring now to FIG. 1, shown is a block diagram of a system in accordance with an embodiment of the present invention. More specifically, system 10 shown in FIG. 1 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 10 includes a bus 15, which may take the form of any medium of communication including printed circuit board, flex cable or other communication media. In embodiments herein, bus 15 may be implemented as an I3C bus in accordance with an I3C specification, available from the MIPI, Inter-Integrated Circuit ($I^2C$) bus according to an $I^2C$ specification available from NXP Semiconductors or another half duplex communication interconnect that may be implemented with a minimal set of wires (e.g., two). Understand that as used herein, the term "IxC" is intended to refer to any and all variations of half-duplex links that may implement an embodiment, such as $I^2C$ or I3C interconnects. None of these specifications (and IxC as defined) includes a native credit protocol. However, understand the scope of the present invention is not limited in this regard and in other embodiments, bus 15 may be implemented as any type of multi-drop interconnect.

As illustrated, a primary or main master device 20 couples to bus 15. In various embodiments, master device 20 may be implemented as a host controller that includes hardware logic to act as a bus master for bus 15. Master device 20 may include a controller (not shown in the high level view of FIG. 1) to control data (SDA) and clock (SCL), as well as use (e.g.) internal current sources or passive pullups to hold bus 15 when all coupled devices are powered off. In some cases, master device 20 may be a relatively simple host controller for a low complexity bus or other multi-drop bus, such as in accordance with an $I^2C$ or I3C specification. Other multi-drop interfaces such as Serial Peripheral Interface and/or Microwire also may be present in a particular embodiment.

In different implementations, master device 20 may be an interface circuit of a multicore processor or other system on chip (SoC), application processor or so forth. In other cases, master device 20 may be a standalone host controller (such as a given integrated circuit (IC)) or main master device for bus 15. And of course other implementations are possible. In other cases, master device 20 may be implemented as hardware, software, and/or firmware or combinations thereof, such as dedicated hardware logic, e.g., a programmable logic, to perform bus master activities for bus 15.

Note that bus 15 is implemented as a two-wire bus in which a single serial line forms a data interconnect and another single serial line forms a clock interconnect. As such, data communications can occur, e.g., in bidirectional manner between masters and slaves and clock communication can occur from master to slaves. Master device 20 may be a relatively compute complex device (as compared to other devices on bus 15) that consumes higher power than other devices coupled to bus 15.

As shown in FIG. 1, multiple secondary master devices 30₁-30ₙ are present. In various embodiments, secondary master devices 30 (generically) may be implemented as dedicated master or bridge devices such as standalone IC's coupled to bus 15. In other cases, these devices may be independent logic functionality of a SoC or other processor (and in some cases may be implemented in the same IC as master device 20 known as a secondary master). One or more such secondary master devices 30 may be controlled to act as bus master for bus 15 while main master device 20 is in a low power state, to enable bus operations to continue to proceed while in this low power state, based on a role definition in which as current master it drives a clock signal. Only one master, either the main or secondary masters, can be the active master at a time. When one is the master, the others are acting as slaves.

As further illustrated in FIG. 1, a plurality of slave devices 40₁-40ₙ also couple to bus 15. In different embodiments, slave devices 40 (generically) may take many different forms. For purposes of discussion herein, it may be assumed that slave devices 40 may be always on (AON) devices, such as sensors like micro-electrical mechanical systems (MEMS), imaging sensors, peer-to-peer devices, debug devices or so forth. Understand while shown at this high level in the embodiment of FIG. 1, many variations and alternatives are possible.

Figure 2:
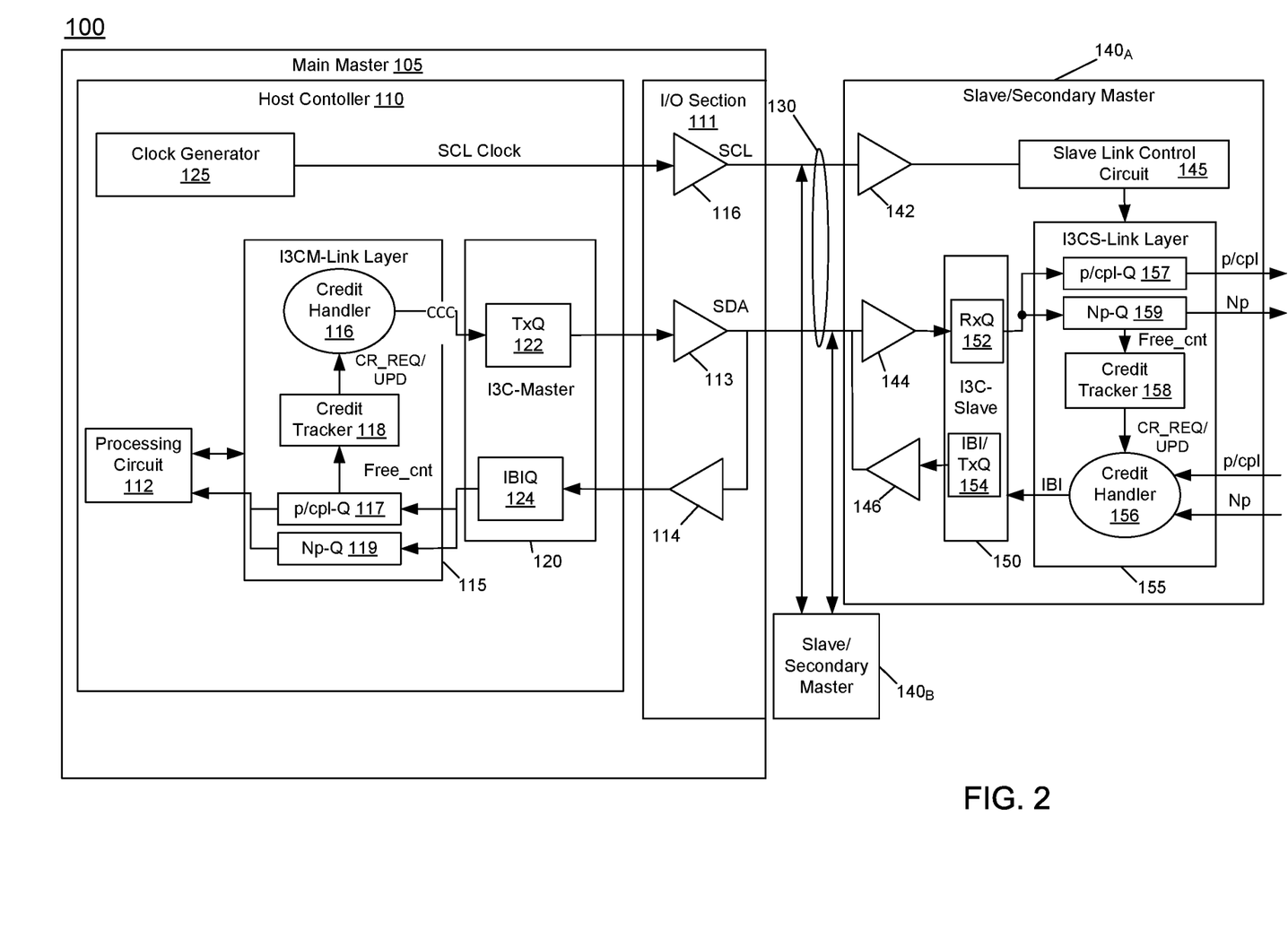
FIG. 2 is a block diagram of a system in accordance with another embodiment of the present invention.

Referring now to FIG. 2, shown is a block diagram of a system in accordance with an embodiment of the present invention. As shown in FIG. 2, a portion of a system 100 includes a main master 105 including a host controller 110 coupled to a plurality of devices 140$_A$-140$_B$ via a multi-drop bus 130. As further illustrated, main master 105 includes an input/output (I/O) section 111. Devices 140 (also referred to herein as "slaves") may have different operational characteristics and also may have different capabilities of being added/removed from bus 130. As will be described herein, host controller 110 may be configured as a bus master, in at least certain operational phases. Bus 130 is implemented as a two-wire bus in which a single serial line forms a data interconnect and another single serial line forms a clock interconnect. As such, data communications can occur in bi-directional manner and clock communications can occur in a unidirectional manner and in between main master to slave directions. In embodiments herein, bus 130 may be implemented as a half-duplex interconnect.

At the high level illustrated in FIG. 2, assume that different types of devices 140 are present. Devices 140$_{A-B}$ may have, inter alia, different physical placements and electrical performance. Specifically, device 140$_A$ may be always powered on and present as being coupled to bus 130. As an example, device 140$_A$ may be a given type of sensor, such as an accelerometer or other sensor which may be incorporated in a given system (such as a smartphone or other mobile platform). For purposes of discussion herein, assume that device 140$_A$ operates as a slave to main master 105 (but may also be configured as a secondary bus master).

Device 140$_B$ may be powered when it is to be active. As an example, assume that device 140$_B$ is another type of sensor, such as a camera device. In such example, device 140$_B$ may be powered on only when a camera functionality of the system is active. In other cases device 140$_B$ may be a slave device that can be physically added/removed via a hot plug or hot unplug operation, such as a cable, card, or external peripheral device that is coupled to bus 130, e.g., by a cable, external connection or so forth. In still other cases, device 140$_B$ may be coupled via an in-box cable. In such cases, there may be a long distance between device 140$_B$ and main master 105. In some embodiments, note that device 140$_B$ may be relatively further away from main master 105 than device 140$_A$.

As illustrated in FIG. 2, host controller 110 includes a processing circuit 112. Understand that many different types of host controllers can be provided. As examples, host controller 110 may be an interface circuit of a multicore processor or other system on chip (SoC), application processor or so forth. In other cases, host controller 110 may be a standalone host controller for bus 130. And of course other implementations are possible. In different implementations, processing circuit 112 may represent one or more cores or other hardware processing logic of a particular device or it may simply be part of an interface circuit to act as transmitter and receiver for host controller 110. In turn, processing circuit 112 couples, via control circuitry to be described further herein, to a driver 113 that drives data onto bus 130 and a receiver 114 that receives incoming data via a data line of bus 130.

Host controller 110 further includes a clock generator 125 to provide a clock signal (and/or to receive a clock signal, in implementations for certain buses) to a clock line of bus 130 via corresponding driver 116. In various embodiments, clock generator 125 may be configured to provide additional clock signals for use in host controller 110 (not shown for ease of illustration).

To provide latency efficiency and reliability for communications via bus 130, embodiments may provide for hardware-based credit handling using hardware-managed control packet communications to communicate and maintain information regarding available buffer space on devices coupled to bus 130. Using this efficient credit handling scheme, software dependencies for communicating data from a slave device 140 to main master 105 can be avoided. More specifically, with these hardware-based techniques, software dependencies are removed. In addition, latency in turning around communication direction on bus 130 can be reduced to enable communication of payload information from a slave device 140 to main master 105 in a high speed read mode, realizing improved performance via higher data rates and greater accuracy, by maintaining and managing credit information associated with buffers or other queues on multiple devices coupled to bus 130.

As further shown in FIG. 2, host controller 110 includes a master device 120, e.g., an I3C master device that includes a set of transmit queues 122 and a set of receive or in-band interrupt (IBI) queues 124. In an embodiment, transmit queues 122 may include a plurality of independent buffers, each configured to store information of a packet to be sent from main master 105 to a slave device 140. Although the scope of the present invention is not limited in this regard, in an embodiment, transaction queues 122 may be configured to store 4 double words (16 bytes) of data. Similarly buffers within the set of IBI queues 124, each configured to store all or part of a packet received from a given slave device 140. In an embodiment, note that there may be a 1:1 relationship between queues 122, 124 and corresponding queues present in slave devices 140. More specifically, master transmit queue 122 may be paired with a receive queue within a slave device 140 in the forward direction and similarly, a slave transmit queue of a slave device 140 is paired with master IBI queue 124 in the reverse direction.

Note that in this reverse direction, IBI queue 140 may store payloads received via auto-generated read commands, as described further herein. Note that queues 122, 124 are for local data storage and may enable multiple command queuing.

As shown, master device 120 in turn couples to a link layer 115, which in an embodiment may be an I3C master link layer. As shown, link layer 115 includes a credit handler 116 which may be implemented as hardware circuitry, in an embodiment. Credit handler 116 couples to a credit tracker 118 that in turn may be in communication with additional buffers 117, 119. Buffers 117, 119 may store information received from a corresponding slave device 140, namely payload data communicated from slave device 140. As illustrated, a separate buffer 117 is provided for storage of posted/completion transactions and buffer 119 is provided for storage of non-posted transactions.

As illustrated, incoming data may be communicated via buffers 117, 119 to processing circuit 112, which may read these buffers using software. When given storage locations within buffers 117, 119 are freed by way of this reading, corresponding updated free count information is provided to credit tracker 118, which may maintain this information and provide it to credit handler 116, e.g., to update credit information on slave device 140 in response to a credit request.

As further illustrated in FIG. 2, similar hardware circuitry may be present within slave devices 140, including an I3C slave device 150 and a corresponding link layer 155. Link layer 155, which in an embodiment may be an I3C slave link layer that includes a credit handler 156. Credit handler 156 couples to a credit tracker 158 that in turn may be in communication with buffers 157, 159. Buffers 157, 159 may store information received from another device, namely payload data. As illustrated, a separate buffer 157 is provided for storage of posted/completion transactions and buffer 159 is provided for storage of non-posted transactions.

Slave device $140_A$ further includes interface circuitry including a driver 146 to communicate information and a receiver 144 to receive information, both of which are coupled to the data line of bus 130. A receiver 142 is configured to receive a clock signal from main master 105 via a clock line of bus 130. Slave device $140_A$ also includes a slave device 150, e.g., an I3C slave device that includes a set of transmit queues 154 and a set of receive queues 152. In an embodiment, transmit queues 154 may include a plurality of independent buffers, each configured to store information of a packet to be sent from slave device 140 to, e.g., main master 105. Similarly buffers within the set of receiver queues 152 may be configured to store all or part of a packet received from, e.g., main master 105. As further shown, slave device $140_A$ also includes a slave link control circuit 145 that is configured to control, at least, link layer 155.

In embodiments, hardware autonomous retrieval of data associated with an IBI at higher data transfer speeds can occur without the need of software involvement to improve bus performance. In embodiment, an I3C common command code (CCC) defining byte (DB) having a predetermined value sent from master to slave and an IBI mandatory data byte (MDB) having a predetermined value sent from slave to master are used to enable hardware-managed control packets to communicate available buffer space on each side as credits. A basic but stable credit handling system can be built using the DB and MDB credit messages to ensure that the link can be used without software intervention. Still further, embodiments enable the link to comply with Peripheral Component Interconnect (PCI) ordering rules (of potentially different traffic classes). By limiting the overall transaction sizes and also by choosing the right I3C data transfer modes (single data rate (SDR) or high data rate (HDR), or super high data rate (SHDR) or a future generation high speed mode) in a configurable manner, bi-directional bus efficiency bus can be achieved.

On the master side, hardware logic of link layer 115 is responsible for detecting an IBI, matching the MDB to a given mask and/or value, and generating a resulting read in a HDR mode at the physical layer. The resulting read from the auto-command operation is also referred to as the auto-read. The master populates the response to the auto-read into IBI queue 124 with the appropriate IBI status. To support the IBI, hardware of link layer 115 issues the auto-read after a T-bit associated with the MDB and packs the following read data from the auto-read into IBI queue 124. If there were additional bytes after MDB, hardware of link layer 115 accepts all bytes from the IBI and then automatically issues the read request. All of the data is packed into IBI queue 124.

If the auto-read command was terminated by a negative acknowledge (NACK) after the slave address, then the hardware will not add any data to IBI queue 124. Software does not get an indication that the slave address for the auto-read was negatively acknowledged. However, the associated payload size would be zero. Otherwise, the auto-read transaction is assumed to be completed successfully when a data byte is terminated with the T-bit.

In order to minimize overhead of control packets and to keep the credit handling layer as simple and lean as possible, each side can request credits by sending a CREDIT_REQUEST command, indicated by either a CCC from the master with a particular value or a particular MDB value of an IBI from the slave. This will be done only when the transmitter does not have enough credits to send a transaction. When a CREDIT_REQUEST is received by the receiver, a CREDIT_UPDATE is sent back to the transmitter. This update is done by either by a particular MDB value of an IBI from the slave or a CCC from the master. The CREDIT_UPDATE message includes the current buffer availability for all transaction types and classes. Note that with a single CREDIT_UPDATE transaction, credits of all supported transaction types and classes are transferred in one-shot, again to maximize bus efficiency.

A CREDIT_REQUEST could be sent to each endpoint as a separate command, or a broadcast transaction can be used to request an update from all connected agents. Table 1 summarizes an example implementation of the CREDIT_REQUEST and CREDIT_UPDATE messages as well as the control packets used to enable the specific PCI transaction ordering rules. Embodiments can be extended to other similar use cases.

TABLE 1

|  | Master -> Slave | Slave -> Master |  |
|---|---|---|---|
| Control Packets send as | CCC | IBI |  |
| Control Packets identified by | DB (defining byte) | MDB (mandatory data byte) |  |
| CREDIT_REQUEST | DB = 0x01 | MDB = 0x01 | Has no payload - can be broadcast as well to all |

TABLE 1-continued

| | Master -> Slave | Slave -> Master | |
|---|---|---|---|
| CREDIT_UPDATE | DB = 0x02 | MDB = 0x02 | connected slaves in a multi-drop system. |

In Table 1, each payload byte of the CREDIT_UPDATE packet can map to a byte of credit (up to 255 bytes) for each transaction type or class of traffic. Bit [1:0] will be masked by the master to indicate auto-command generation. This allows avoiding auto-command generation on control packets. Bits [3:2] will be unmasked and matched to 1/2/3 to enable SDR/DDR/TSP modes of auto-read on IBI. For example, if bits [3:2]='10', then before the actual read request from the master, it will negotiate to DDR mode first. Remaining bits [7:4] are reserved for future expansion.

Figure 3:
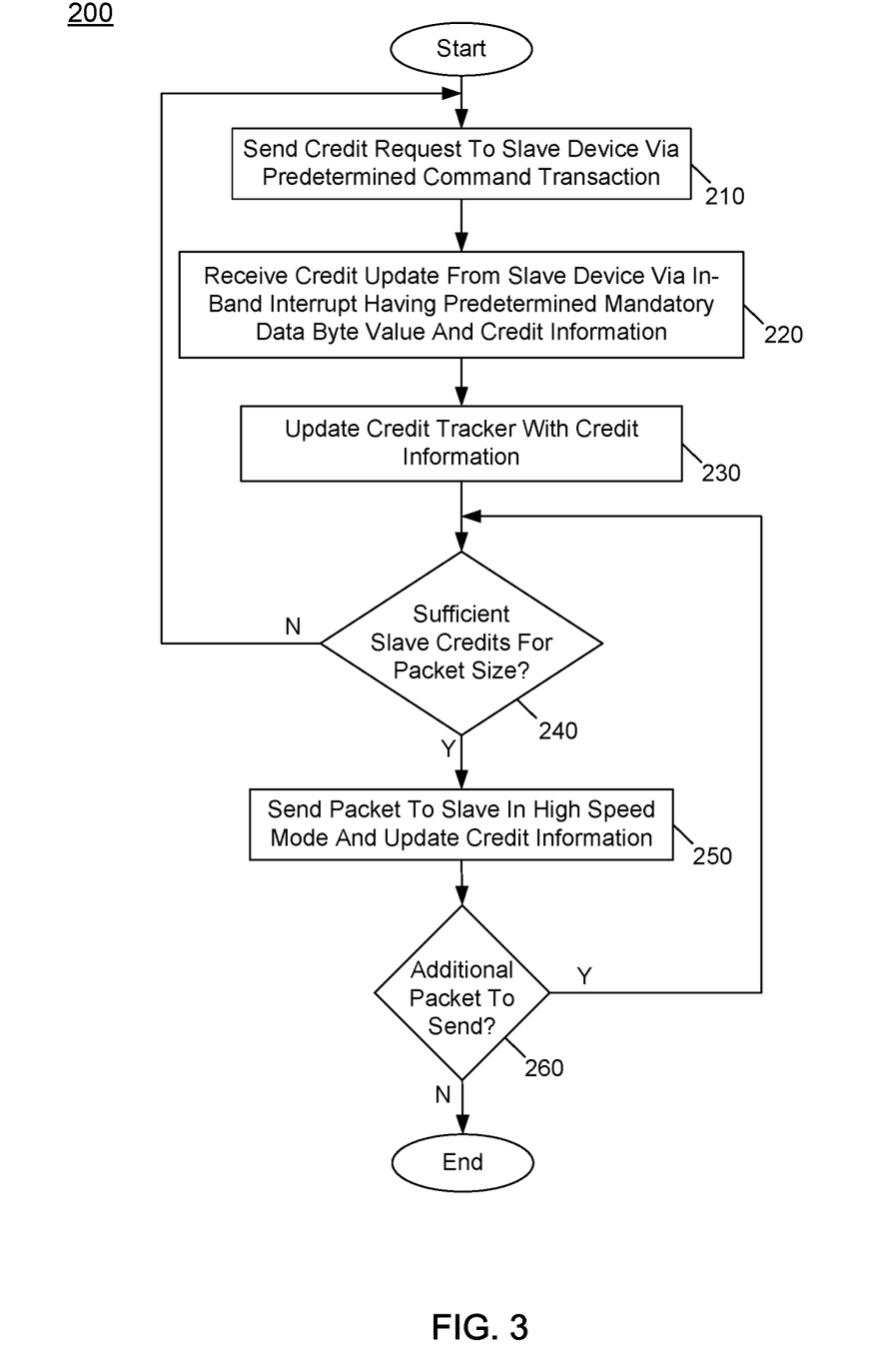
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 may be performed by hardware, software, firmware and/or combinations thereof. In a particular embodiment, method 200 may be performed by hardware circuitry of a bus master such as a host controller as described herein. More specifically, method 200 can be performed by physical layer and/or link layer circuitry of a master device that seeks to write information to a slave device with which it is coupled. Furthermore, to ensure that this write of a given packet size is successfully received, the master device, via this hardware circuitry may first ensure that there is sufficient buffer space in the receiving slave device to receive the full packet.

Thus as illustrated in FIG. 3, method 200 begins by sending a credit request to the slave device via a predetermined command transaction (block 210). In an embodiment, this command transaction may be a CCC command having a particular value. Next in response to this credit request, the master device receives a credit update from the slave device (block 220). More specifically, this credit update may be set via an IBI that has a predetermined mandatory data byte value. In addition, with this MDB value that thus identifies the communication as a credit update communication, credit information also may be provided. In an embodiment, this credit information may include separate credit values for separate queues of the slave device, e.g., posted and non-posted queues. As an example, the credit information may include a first credit value to indicate an amount of available buffer space for a set of posted queues and a second credit value to indicate an amount of available buffer space for a set of non-posted queues.

Still with reference to FIG. 3, next credit tracker information within the master device may be updated with this credit information (block 230). For example, a credit tracker located in a link layer of the master device may update its count of available credits for these separate queues of the slave device. Next, it is determined whether there are sufficient credits available for the size of a packet to be communicated (diamond 240). In an embodiment, the credit tracker may thus verify that for a packet to be communicated with a particular packet size (e.g., packet size X), there is sufficient buffer space for the type of packet. Assume that the packet is a non-posted packet, the credit tracker thus determines whether the credit information indicates that the slave device has at least X available non-posted buffer space for this packet. If so, control passes to block 250 where the packet can be sent to the slave device in a high speed mode (e.g., in an HDR mode). And the credit tracker may update the credit information to remove the number of credits to send the packet.

Otherwise if insufficient credits are available, control passes back to block 210, discussed above. After communication of the packet (at block 250), the master device may determine whether it has an additional packet to send (diamond 260). If so, control passes directly to diamond 240 to determine whether after the sending of the first packet there still remains sufficient credits on the receiver side to receive this new packet. Note that as a packet is communicated, the credit tracker may update the credit information for the communicated packet so that this next determination at diamond 240 is accurate. Also note that with this arrangement, a credit scheme is implemented using predetermined packet types of a given communication protocol to enable communication and maintaining of credit information within low level hardware of communicating devices. As such, embodiments can avoid such the latency of requiring interaction with software, allowing for low latency and high speed data communications in a manner that ensures that a receiver can successfully receive a communicated packet. Understand while shown at this high level in the embodiment of FIG. 3, many variations and alternatives are possible.

Figure 4:
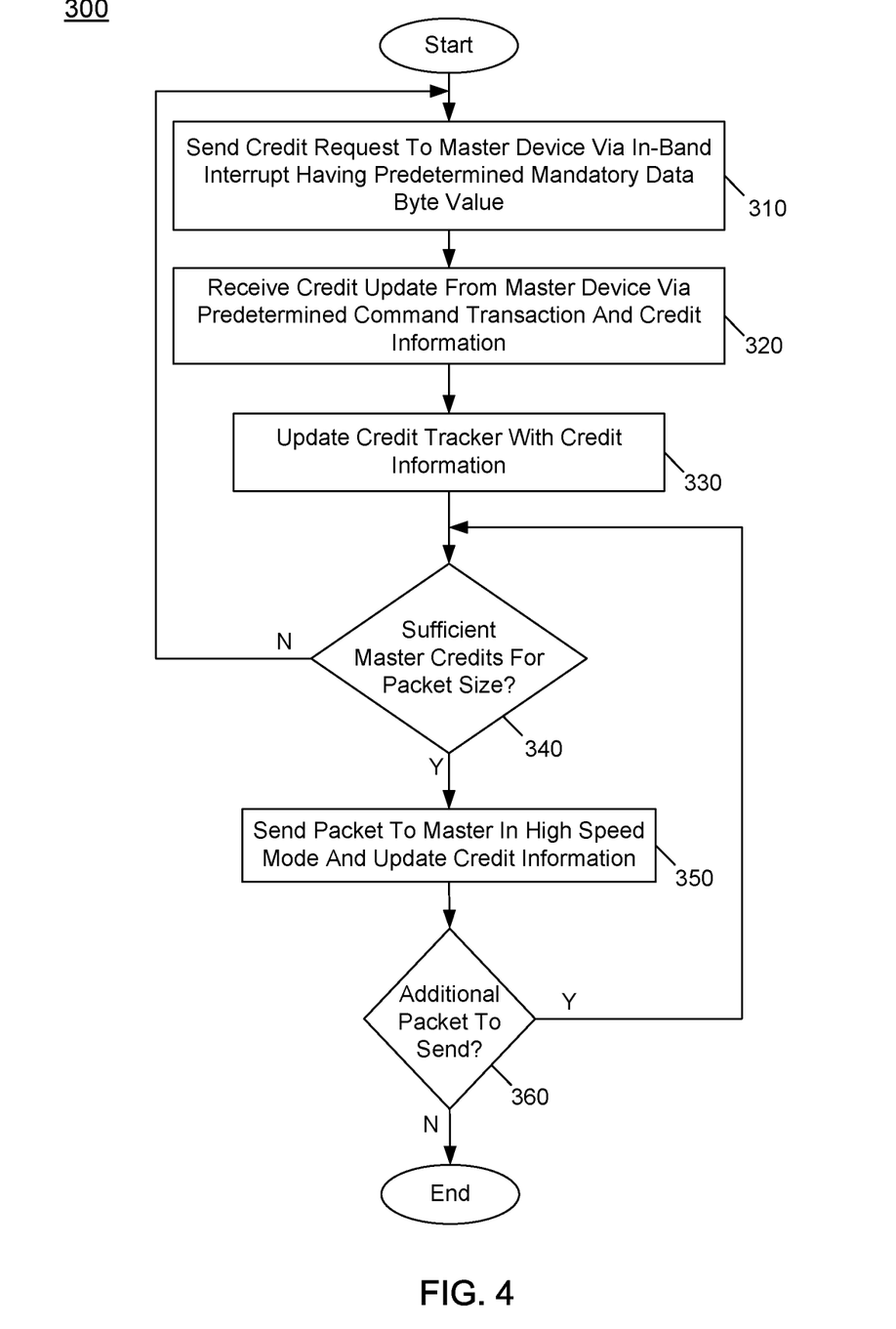
FIG. 4 is a flow diagram of a method in accordance with another embodiment of the present invention.

Referring now to FIG. 4, shown is a flow diagram of a method in accordance with an embodiment of the present invention. As shown in FIG. 4, method 300 may be performed by hardware, software, firmware and/or combinations thereof. In a particular embodiment, method 300 may be performed by hardware circuitry of a slave device. More specifically, method 300 can be performed by physical layer and/or link layer circuitry of a slave device that seeks to write information to a master device with which it is coupled.

Method 300 begins by sending a credit request to the master device via a predetermined in-band interrupt (block 310). In an embodiment, this IBI may have a predetermined MDB value to identify the credit request. Next in response to this credit request, the slave device receives a credit update from the master device (block 320). More specifically, this credit update may be set via a CCC with a predetermined defining byte value. In addition, with this DB value that thus identifies the communication as a credit update communication, credit information also may be provided such as described above.

Still with reference to FIG. 4, next credit tracker information within the slave device may be updated with this credit information (block 330). For example, a credit tracker located in a link layer of the slave device may update its count of available credits for these separate queues of the master device. Next, it is determined whether there are sufficient credits available for the size of a packet to be communicated (diamond 340). In an embodiment, the credit tracker may thus verify that for a packet to be communicated with a particular packet size (e.g., packet size X), there is sufficient buffer space for the type of packet. If so, control passes to block 350 where the packet can be sent to the master device as an auto-read in a high speed mode (e.g., in an HDR mode). And the credit tracker may update the credit information to remove the number of credits to send the packet.

Otherwise if insufficient credits are available, control passes back to block 310, discussed above. After communication of the packet (at block 350), the slave device may determine whether it has an additional packet to send (diamond 360). If so, control passes directly to diamond 340 to determine whether after the sending of the first packet there still remains sufficient credits on the receiver side to receive this new packet. Understand while shown at this high level in the embodiment of FIG. 4, many alternatives are possible.

Figure 5:
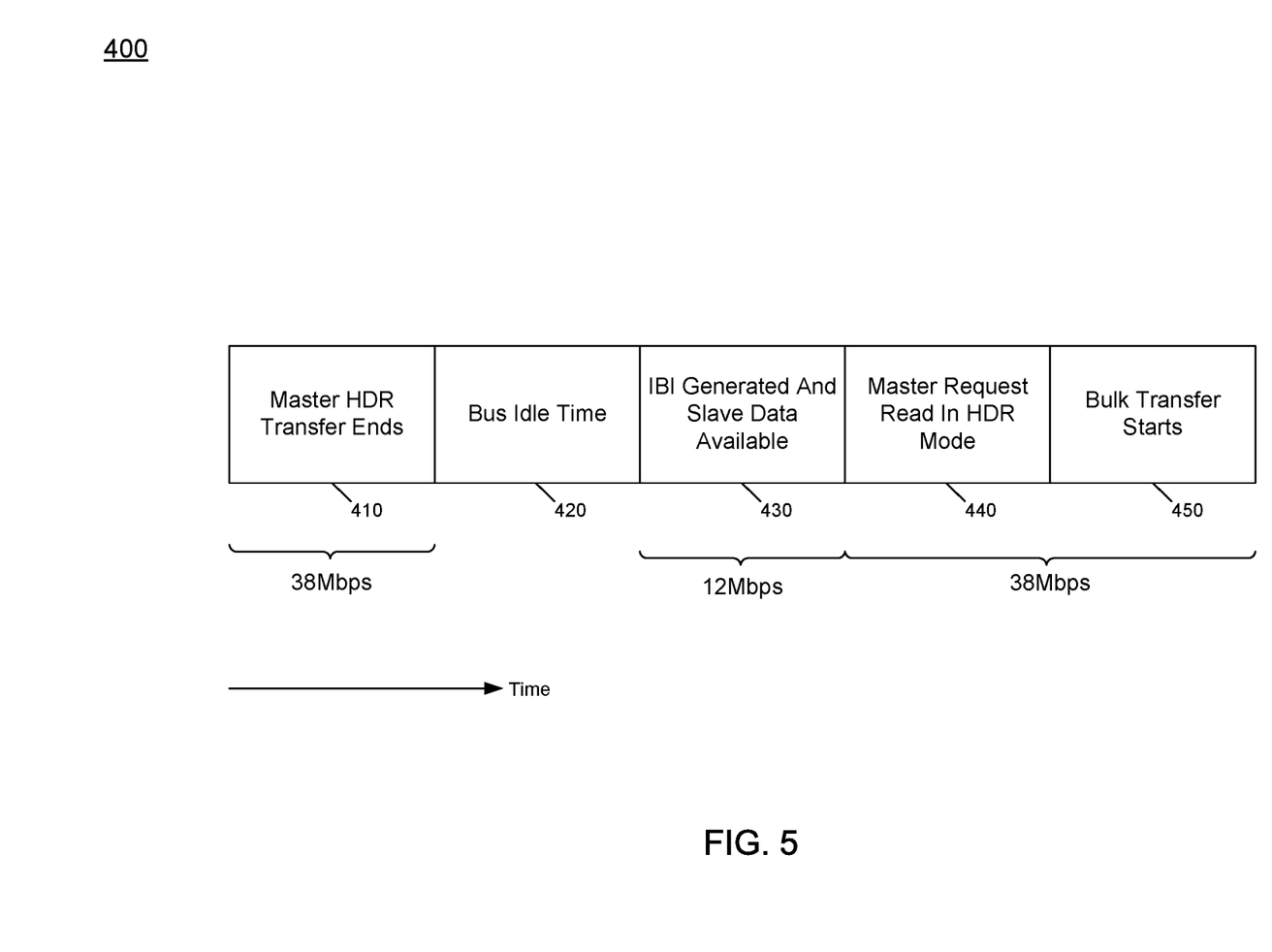
FIG. 5 is a timing diagram illustrating various signals in accordance with an embodiment of the present invention.

Referring now to FIG. 5, shown is a timing diagram of communications in accordance with an embodiment. As shown in FIG. 5, timing diagram 400 shows a series of communications between a master device and a slave device in accordance with an embodiment. As shown in FIG. 5, in timing diagram 400, in a first time period 410 a master may communicate data to the slave in a high speed (e.g., HDR or SHDR) transfer mode. As illustrated, this communication may occur at a speed of 38 megabits per second (Mbps) or any future generation targeted speed. When this transfer ends, a bus idle time occurs at time period 420 (e.g., which may be approximately 6 microseconds).

After this idle period, assume that the slave seeks to transfer data. To effect this transfer, first an IBI communication occurs to cause the turnaround on the bus (at time period 430). Note that this IBI communication may be handled solely within hardware of the master device, such that there is no latency incurred in sending this command to higher layers such as a driver or software for handling. Thereafter, the master issues a read request, in response to the IBI (at time period 440). Note that this request may be for communication of the read data from the slave device to the master in a high speed mode, such that a bulk data transfer may occur with minimal latency and at high speed (e.g., 38 Mbps or another speed) (at time period 450).

Thus with a communication arrangement as in FIG. 5, reduced latency may occur during an autonomous IBI data read mode. This is so, as software dependency is removed and latencies may be reduced as the turnaround of the bus is done at the lowest possible physical layer. Note that the IBI payload sent from the slave device to the master to initiate this autonomous read may include only the MDB to gain maximum performance. Furthermore, this MDB is intercept and handled in low level hardware of the master device, again reducing latency. Understand while shown with this particular implementation in FIG. 5, many variations and alternatives are possible.

Figure 6:
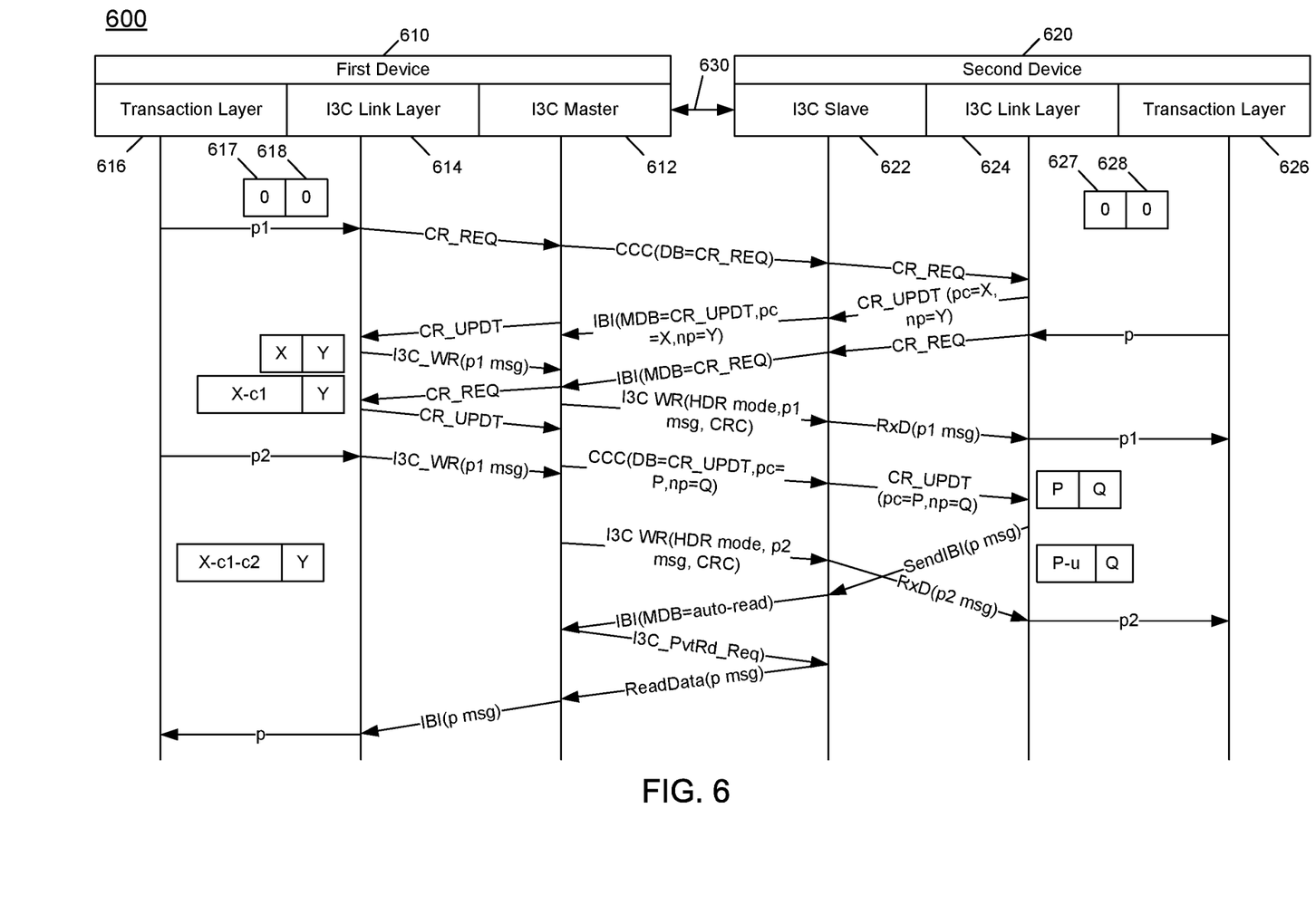
FIG. 6 is a transaction diagram illustrating sending of transactions between a first device and a second device in accordance with an embodiment of the present invention.

Referring now to FIG. 6, shown is a transaction diagram illustrating sending of transactions between a first device 610, e.g., a master device and a second device 620, e.g., a slave device of a system 600, interconnected via an interconnect 630 in accordance with an IxC-based communication protocol.

As illustrated, first device 610, which may be any type of integrated circuit having processing capability, such as a multicore processor or other SoC (as examples), includes an I3C master device 612, an I3C link layer 614, and a transaction layer 616. In embodiments, note that transaction layer 616 may be of a different communication protocol than link layer 614 and master 612. For example, in an embodiment master and link layers may be of a given IxC communication protocol and transaction layer 616 may be of another communication protocol, e.g., a PCIe communication protocol. As further shown, link layer 614 may include credit counters to maintain credit information for buffer space in second device 620. More specifically shown, these counters include a first counter 618 to maintain credit information regarding posted and completion traffic classes and a second counter 617 may maintain information regarding a non-posted transaction class. Note that similar components are present in second device 620, including an IxC slave device 622, an I3C link layer 624, and a transaction layer 626, e.g., of a PCIe communication protocol. As further illustrated, link layer 624 includes corresponding credit counters 627, 628.

FIG. 6 further illustrates a flow of communications between the two devices via interconnect 630. Specifically to enable first and second messages p1 and p2 that consume, respectively credits c1 and c2 to occur from first device 610 to second device 620, a credit request protocol first occurs using a predetermined CCC command, which results in receipt of credit update information, used to update credit counters 617, 618. Thereafter, first device 610 communicates the first message p1 in a high speed mode (e.g., HDR mode with cyclic redundancy check (CRC) information). Determining further that sufficient credits exist after this first message communication, first device 610 may directly send second message p2 via another high speed write communication, without seeking further credits.

In a reverse direction, second device 620, in order to send a message p that is to consume u credits, first performs a credit request transaction via a predetermined in-band interrupt message, responsive to which it receives a credit update from first device 610 corresponding to a maximum credit/buffer space on first device 610, namely P, Q credits. With sufficient credits thus existing, second device 620 sends message p via an in-band interrupt communication. More specifically note that slave device 622 may issue an auto-read request via an IBI. Responsive to this request, master device 612 issues a private read request, which causes slave device 622 to send message p as a read data communication, also in HDR mode. Understand while shown with these particular communication flows for example purposes many other types of communications and redirections on interconnect 630 may occur.

Figure 7:
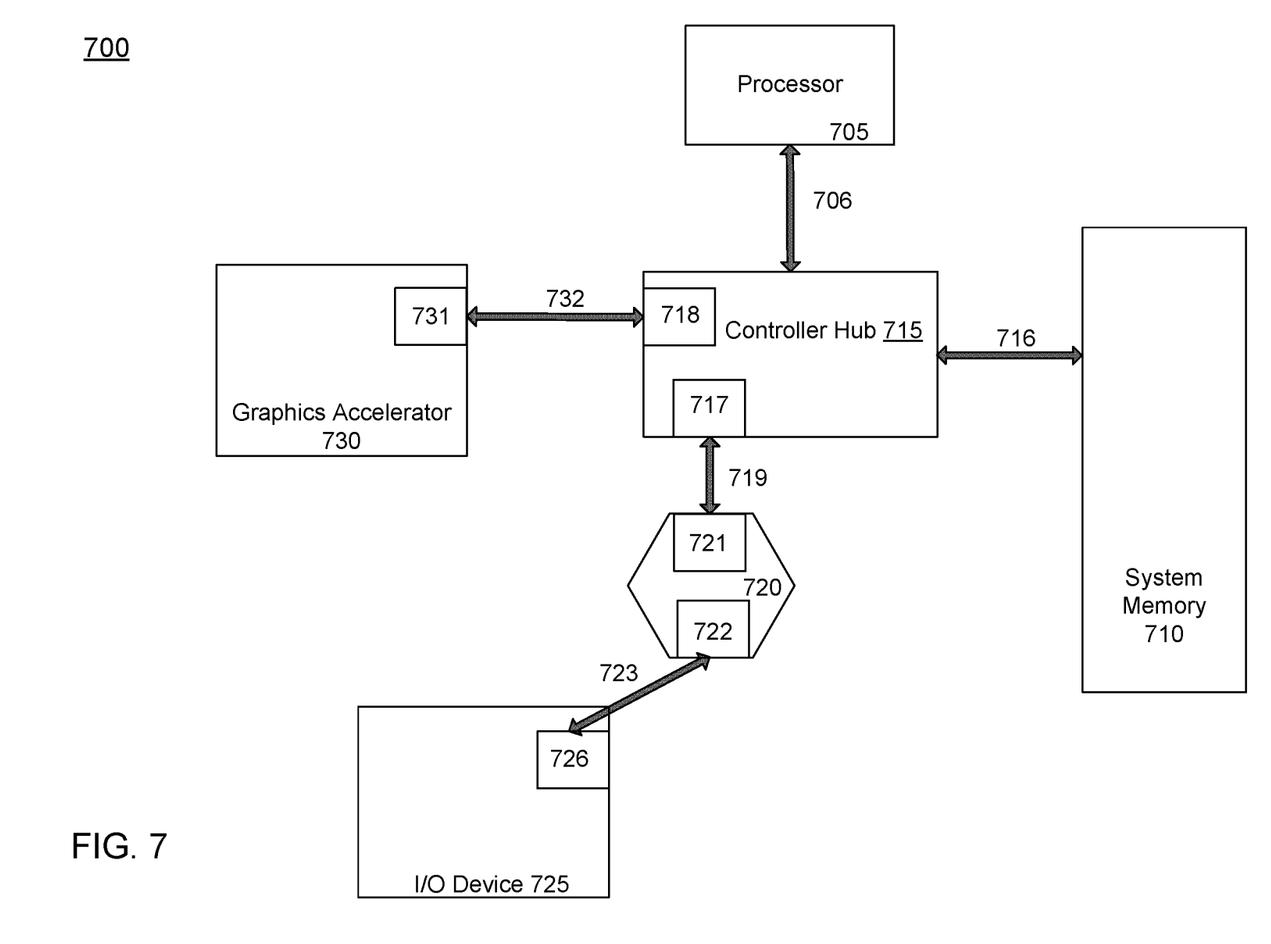
FIG. 7 is an embodiment of a fabric composed of point-to-point links that interconnect a set of components.

Embodiments may be implemented in a wide variety of interconnect structures. Referring to FIG. 7, an embodiment of a fabric composed of point-to-point links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect. In another embodiment, link 706 includes a parallel serial, differential interconnect architecture that is compliant with different interconnect standards, and which may couple with one or more host controllers to perform hardware-based credit control and bus turnarounds as described herein.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a PCIe interconnection hierarchy. Examples of controller hub 715 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e., up a hierarchy towards a root complex, to controller hub 715 and downstream, i.e., down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. A graphics controller or the graphics accelerator 730 itself may be integrated in processor 705.

Figure 8:
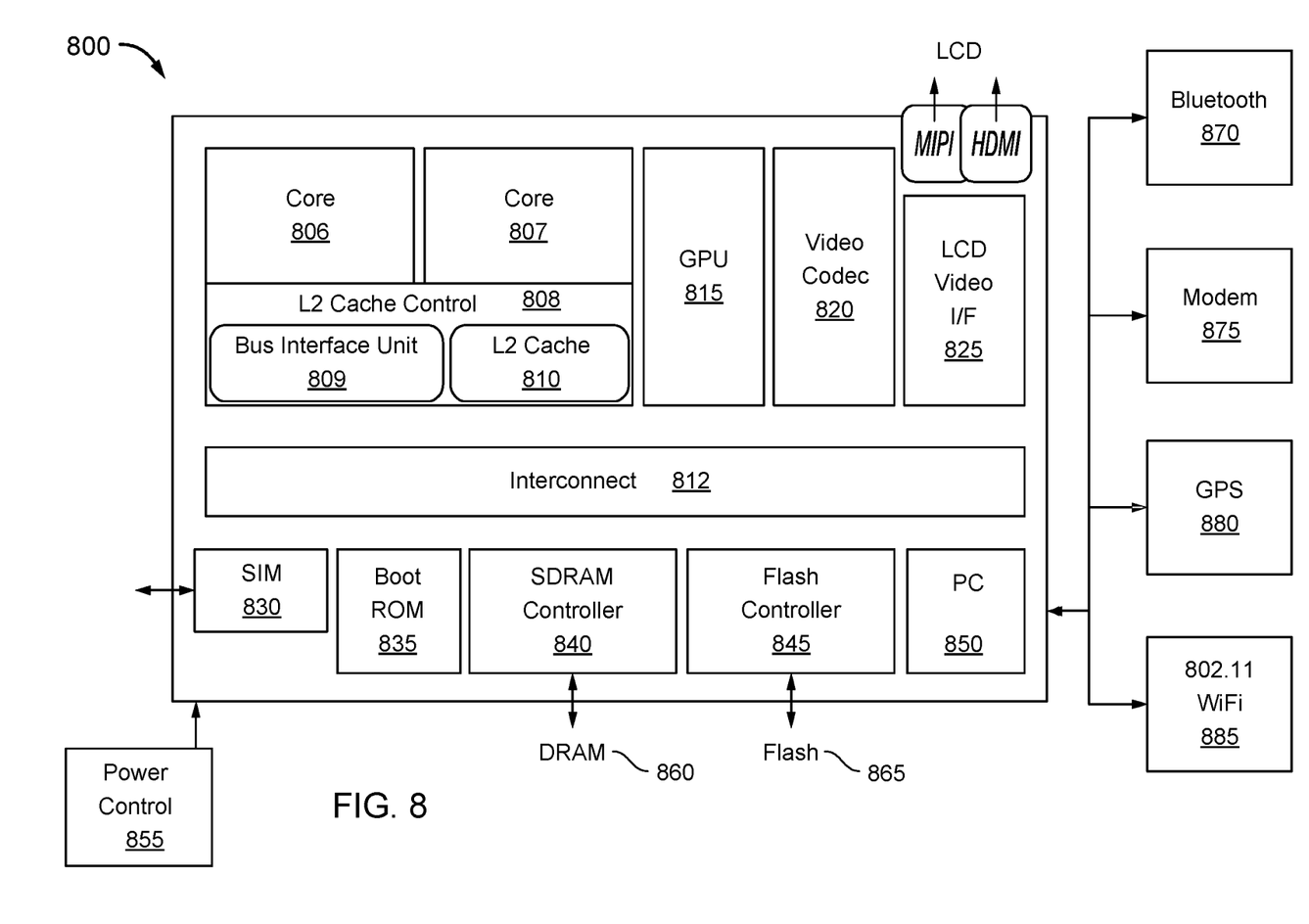
FIG. 8 is an embodiment of a system-on-chip design in accordance with an embodiment.

Turning next to FIG. 8, an embodiment of a SoC design in accordance with an embodiment is depicted. As a specific illustrative example, SoC 800 may be configured for insertion in any type of computing device, ranging from portable device to server system. Here, SoC 800 includes 2 cores 806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800 via an interconnect 812.

Interconnect 812 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g., DRAM 860), a flash controller 845 to interface with non-volatile memory (e.g., flash 865), a peripheral controller 850 (e.g., an eSPI interface) to interface with peripherals, video codecs 820 and video interface 825 to display and receive input (e.g., touch enabled input), GPU 815 to perform graphics related computations, etc. Any of these interconnects/interfaces may incorporate aspects described herein, including hardware-based credit control and bus turnarounds. In addition, the system illustrates peripherals for communication, such as a Bluetooth module 870, 3G modem 875, GPS 880, and WiFi 885. Also included in the system is a power controller 855.

Figure 9:
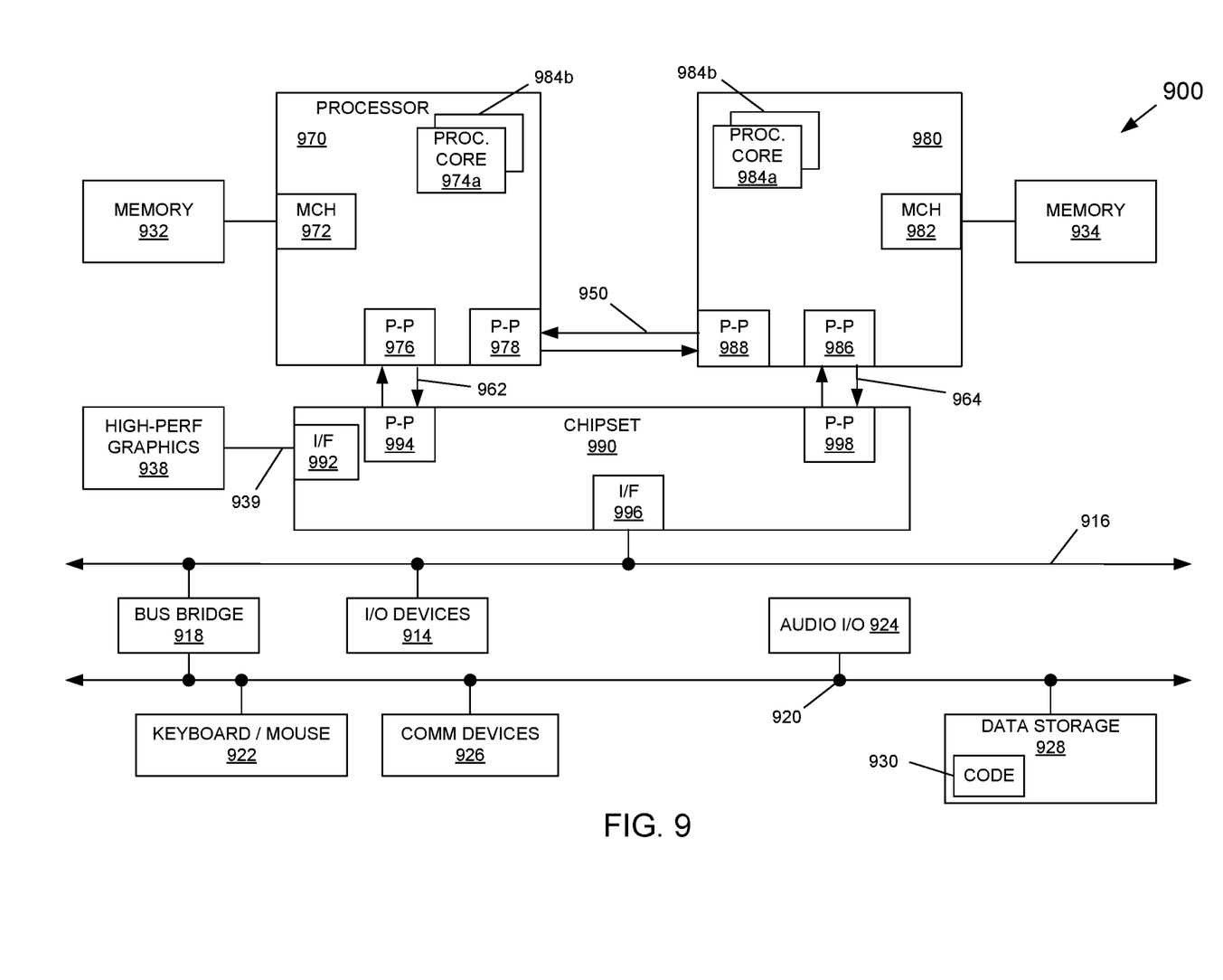
FIG. 9 is a block diagram of a system in accordance with an embodiment of the present invention.

Referring now to FIG. 9, shown is a block diagram of a system in accordance with an embodiment of the present invention. As shown in FIG. 9, multiprocessor system 900 includes a first processor 970 and a second processor 980 coupled via a point-to-point interconnect 950. As shown in FIG. 9, each of processors 970 and 980 may be many core processors including representative first and second processor cores (i.e., processor cores 974a and 974b and processor cores 984a and 984b).

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 962 and 964, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. Further, an audio I/O 924 may be coupled to second bus 920. Any of the devices shown in FIG. 9 may be configured to perform hardware-based credit control and bus turnarounds for one or more of the interconnect structures, as described herein.

The following examples pertain to further embodiments.

In one example, an apparatus includes a host controller that is to couple to an interconnect to which a plurality of devices may be coupled. The host controller may include: a first driver to drive first information onto the interconnect; a first receiver to receive second information from at least one of the plurality of devices via the interconnect; a first set of queues to store information to be communicated to a first device of the plurality of devices; a second set of queues to store information to be received from the first device; a first credit tracker comprising at least one credit counter to maintain credit information for the first device; and a first credit handler to send a command code having a first predetermined value to indicate a credit request to request credit information from the first device, where the first credit tracker is to update the at least one credit counter based on receipt of an in-band interrupt from the first device having the credit information.

In an example, the first credit handler is to send the command code having the predetermined value as a broadcast message to the plurality of devices, to request the credit information from the plurality of devices.

In an example, the first credit tracker is to obtain the credit information from the in-band interrupt without interaction with software.

In an example, the first credit handler is to send a first packet to the first device in response to a determination, based at least in part on the credit information, that the first device has sufficient resources to accept the first packet.

In an example, the first credit handler is to send a second packet to the first device following the first packet without another credit request, in response to a determination, based at least in part on the credit information, that the first device has sufficient resources to accept the second packet.

In an example, the first packet comprises a half-duplex packet to comply with PCI transaction ordering rules and the interconnect is of a half-duplex communication protocol.

In an example, the first credit handler is to send a plurality of half-duplex packets in an order that complies with the PCI transaction ordering rules.

In an example, the interconnect comprises a half-duplex link.

In an example, the host controller is to receive a second in-band interrupt from the first device, the second in-band interrupt to indicate an auto-read for a second packet, the host controller to perform the auto-read without software support.

In an example, the host controller, in response to the second in-band interrupt, is to issue a read request to the first device and in response to the read request to receive the second packet, the second packet communicated in a high speed mode of the interconnect.

In another example, a method comprises: receiving, in a master device coupled to a plurality of devices via an interconnect, a credit update to identify available buffer space in a first device of the plurality of devices; updating at least one credit counter of a link layer of the master device in response to the credit update; and sending a first packet from the master device to the first device when the available buffer space in the first device is sufficient to accept the first packet.

In an example, the method further comprises sending a second packet from the master device to the first device when the available buffer space in the first device is sufficient to accept the second packet, the second packet sent without receipt of another credit update from the first device.

In an example, the method further comprises, in response to the credit request from the first device, sending a second predetermined command code to the first device, the second predetermined command code comprising at least one value to identify available buffer space in the master device.

In an example, the method further comprises receiving the credit update in the master device in response to a first credit request sent from the master device to the first device, the first credit request comprising a first predetermined command code.

In an example, the credit update comprises a first predetermined in-band interrupt sent from the first device, the first predetermined in-band interrupt comprising at least one value to identify the available buffer space in the first device.

In an example, the method further comprises receiving, in the master device, a credit request from the first device, the credit request comprising a second predetermined in-band interrupt.

In an example, the method further comprises: receiving, in the master device, an auto-read request from the first device; in response to the auto-read request, sending a private read request from the master device to the first device; and receiving, in the master device, a third packet from the first device in response to the private read request.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system includes a processor having: at least one processing circuit to execute instructions; and a host controller coupled to the at least one processing circuit to control communication on an interconnect to which a plurality of devices are coupled. The host controller may include: a credit handler to send a command code having a first predetermined value to request credit information from a first device of the plurality of devices, receive the credit information in a first in-band interrupt from the first device, determine based at least in part on the credit information that the first device has available buffer space to receive a first packet, and, in response to the determination, send the first packet to the first device. The system may further include the interconnect to couple the processor to at least the first device, the interconnect comprising a half-duplex link and the first device coupled to the processor via the interconnect, where the first device is to send a second in-band interrupt to the processor to initiate an auto-read of data from the first device.

In an example, the first device is to send the first in-band interrupt with a first predetermined code and at least one value to identify the available buffer space, and to send the second in-band interrupt with a second predetermined code to request the auto-read.

In an example, the interconnect is of a communication protocol lacking a native credit handling protocol.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD- ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a host controller to couple to an interconnect to which a plurality of devices may be coupled, the host controller including:
a first driver to drive first information onto the interconnect;
a first receiver to receive second information from at least one of the plurality of devices via the interconnect;
a first set of queues to store information to be communicated to a first device of the plurality of devices;
a second set of queues to store information to be received from the first device; a first credit tracker comprising at least one credit counter to maintain credit information to indicate available buffer space in the first device; and
a first credit handler to send a command code having a first predetermined value to indicate a credit request to request the credit information from the first device, wherein the first credit tracker is to update the at least one credit counter based on receipt of an in-band interrupt from the first device having the credit information.

2. The apparatus of claim 1, wherein the first credit handler is to send the command code having the predetermined value as a broadcast message to the plurality of devices, to request the credit information from the plurality of devices.

3. The apparatus of claim 1, wherein the first credit tracker is to obtain the credit information from the in-band interrupt without interaction with software.

4. The apparatus of claim 1, wherein the first credit handler is to send a first packet to the first device in response to a determination, based at least in part on the credit information, that the first device has sufficient resources to accept the first packet.

5. The apparatus of claim 4, wherein the first credit handler is to send a second packet to the first device following the first packet without another credit request, in response to a determination, based at least in part on the credit information, that the first device has sufficient resources to accept the second packet.

6. The apparatus of claim 4, wherein the first packet comprises a half-duplex packet to comply with Peripheral Component Interconnect (PCI) transaction ordering rules and the interconnect is of a half-duplex communication protocol.

7. The apparatus of claim 6, wherein the first credit handler is to send a plurality of half-duplex packets in an order that complies with the PCI transaction ordering rules.

8. The apparatus of claim 6, wherein the interconnect comprises a half-duplex link.

9. The apparatus of claim 1, wherein the host controller is to receive a second in-band interrupt from the first device, the second in-band interrupt to indicate an auto-read for a second packet, the host controller to perform the auto-read without software support.

10. The apparatus of claim 9, wherein the host controller, in response to the second in-band interrupt, is to issue a read request to the first device and in response to the read request to receive the second packet, the second packet communicated in a high speed mode of the interconnect.

11. At least one computer readable storage medium having stored thereon instructions, which if performed by a machine cause the machine to perform a method comprising:
receiving, in response to a first credit request from a master device coupled to a plurality of devices via an interconnect, a credit update to identify available buffer space in a first device of the plurality of devices;
updating at least one credit counter of a link layer of the master device in response to the credit update; and
sending a first packet from the master device to the first device when the available buffer space in the first device is sufficient to accept the first packet.

12. The at least one computer readable storage medium of claim 11, wherein the method further comprises sending a second packet from the master device to the first device when the available buffer space in the first device is sufficient to accept the second packet, the second packet sent without receipt of another credit update from the first device.

13. The at least one computer readable storage medium of claim 11, wherein the method further comprises, in response to a credit request from the first device, sending a second predetermined command code to the first device, the second predetermined command code comprising at least one value to identify available buffer space in the master device.

14. The at least one computer readable storage medium of claim 13, the first credit request comprising a first predetermined command code.

15. The at least one computer readable storage medium of claim 11, wherein the credit update comprises a first predetermined in-band interrupt sent from the first device, the first predetermined in-band interrupt comprising at least one value to identify the available buffer space in the first device.

16. The at least one computer readable storage medium of claim 15, wherein the method further comprises receiving, in the master device, a credit request from the first device, the credit request comprising a second predetermined in-band interrupt.

17. The at least one computer readable storage medium of claim 11, wherein the method further comprises:
receiving, in the master device, an auto-read request from the first device;
in response to the auto-read request, sending a private read request from the master device to the first device; and
receiving, in the master device, a third packet from the first device in response to the private read request.

18. A system comprising:
a processor having:
at least one processing circuit to execute instructions; and
a host controller coupled to the at least one processing circuit to control communication on an interconnect to which a plurality of devices are coupled, the host controller including:

a credit handler to send a command code having a first predetermined value to request credit information from a first device of the plurality of devices, receive the credit information in a first in-band interrupt from the first device, determine based at least in part on the credit information that the first device has available buffer space to receive a first packet, and, in response to the determination, send the first packet to the first device;

the interconnect to couple the processor to at least the first device, the interconnect comprising a half-duplex link; and the first device coupled to the processor via the interconnect, wherein the first device is to send a second in-band interrupt to the processor to initiate an auto-read of data from the first device.

19. The system of claim 18, wherein the first device is to send the first in-band interrupt with a first predetermined code and at least one value to identify the available buffer space, and to send the second in-band interrupt with a second predetermined code to request the auto-read.

20. The system of claim 18, wherein the interconnect is of a communication protocol lacking a native credit handling protocol.

* * * * *